(12) United States Patent
Oakley et al.

(10) Patent No.: US 9,063,685 B2
(45) Date of Patent: Jun. 23, 2015

(54) DESKTOP ENVIRONMENT COLOR ALERT SYSTEM FOR PRINTING DEVICES

(71) Applicant: Xerox Corporation, Norwalk, CT (US)

(72) Inventors: Mark Oakley, St Neots (GB); Gary Simmonds, Hertford (GB); John McSherry, High Wycombe (GB); Andrew Machin, Milton Keynes (GB); Daniel O'Kane, Godmanchester (GB)

(73) Assignee: XEROX CORPORATION, Norwalk, CT (US)

( * ) Notice: Subject to any disclaimer, the term of this patent is extended or adjusted under 35 U.S.C. 154(b) by 37 days.

(21) Appl. No.: 13/786,822

(22) Filed: Mar. 6, 2013

(65) Prior Publication Data

US 2014/0253953 A1 Sep. 11, 2014

(51) Int. Cl.
*G06F 3/12* (2006.01)
*G06F 11/30* (2006.01)

(52) U.S. Cl.
CPC ............ *G06F 3/1285* (2013.01); *G06F 3/1207* (2013.01); *G06F 3/1229* (2013.01); *G06F 11/30* (2013.01)

(58) Field of Classification Search
USPC .................................................. 358/1.1–3.29
See application file for complete search history.

(56) References Cited

U.S. PATENT DOCUMENTS

| 7,782,224 | B2 | 8/2010 | Marchetti | |
|---|---|---|---|---|
| 2003/0048469 | A1* | 3/2003 | Hanson | 358/1.14 |
| 2004/0114953 | A1* | 6/2004 | Penke et al. | 399/81 |
| 2006/0184818 | A1* | 8/2006 | Fujinawa | 714/4 |
| 2011/0143817 | A1* | 6/2011 | Asabu et al. | 455/566 |

* cited by examiner

*Primary Examiner* — Marcellus Augustin
(74) *Attorney, Agent, or Firm* — Fay Sharpe LLP

(57) ABSTRACT

A method and system for utilizing the desktop environment of the image processing system's user interface as a system status indicator is provided. In one embodiment, a fault code is received from one or more machine sensors at an image processing unit of an image processing system. The fault code is used to determine a corresponding machine state and desktop environment color indicator via a look-up table stored in a database. As a result, an appropriate signal is sent to a user interface of the image processing system to display on a desktop environment of the user interface a particular color and operation representing the corresponding machine state. In this way, it is not necessary for the image processing system to include hardware associated with one or more warning lights and thus costs are reduced. In addition, spare parts relating to the light hardware will not need to be stocked.

14 Claims, 5 Drawing Sheets

DESKTOP ENVIRONMENT COLOR ALERT SYSTEM FOR PRINTING DEVICES

BACKGROUND

The methods and systems illustrated herein in embodiments are related generally to the art of digital image processing. More specifically, methods and systems will be described for providing customized warning indications on the desktop environment of a user interface associated with an image processing system.

By way of background, commercially available image processing systems, or printing devices, typically include one or more monochromatic indicator lights configured to visually indicate to the user the current status or machine state of the printing device. These indicator lights provide a warning indication to signal to the operator that the printing device requires maintenance, consumable supplies, or paper refill, among other things.

In the prior art systems, however, the operator was required to be in front of the machine, checking status through the user interface menu tabs. Without being in the front of the machine it was not possible to see the status of consumables (e.g., toner and/or paper).

The exemplary embodiments disclosed herein contemplate new and improved methods and systems that resolve the above-referenced difficulties and others.

BRIEF DESCRIPTION

A method and system for utilizing the desktop environment of the image processing system's user interface as a system status indicator is provided. In one embodiment, a fault code is received from one or more machine sensors at an image processing unit of an image processing system. The fault code is used to determine a corresponding machine state and desktop environment color indicator via a look-up table stored in a database. As a result, an appropriate signal is sent to a user interface of the image processing system to display on a desktop environment of the user interface a particular color and operation representing the corresponding machine state. In this way, it is not necessary for the image processing system to include hardware associated with one or more warning lights and thus costs are reduced. In addition, spare parts relating to the light hardware will not need to be stocked.

In another embodiment, an image processing system is provided. The image processing system includes, for example, a database that stores data related to digital image processing, including at least one look-up table relating to desktop environment color alerts that signal to the operator that the image processing system may need attention or maintenance. The image processing system may also include an image processing unit configured to: receive a fault code from one or more machine sensors; use the fault code to determine a corresponding machine state and desktop environment color indicator via a look-up table stored in the database; and/or send an appropriate signal to a user interface operably coupled to the image processing system to display on a desktop environment of the user interface at least one color and at least one behavior setting representing the corresponding machine state.

In yet another embodiment, a method is provided. The method includes detecting an unexpected event in an image processing system via one or more sensors; sending at least one fault code associated with the unexpected event to an image processing unit; using a look-up table stored in the database to determine the corresponding machine state and at least one desktop color indicator and behavior setting for the unexpected event or fault code; and/or sending a signal to a user interface operably coupled to the image processing unit to display a specific color and behavior for the unexpected event or fault code.

In yet another embodiment, an image processing system is provided. The image processing system may include, for example, a user interface including a desktop environment adapted to operate in at least one of an off state, a flashing state, and a steady state to indicate the detected machine state; one or more sensors configured to detect at least one machine state corresponding to the operation of the image processing system; and/or at least one image processing unit in operative communication with the at one or more sensors and adapted to provide at least one user setting to the user interface, the at least one user setting including at least one behavior setting configured to selectively set the desktop environment to one of the off state, the flashing state, and the steady state based on the detected machine state.

DETAILED DESCRIPTION

Figure 1:
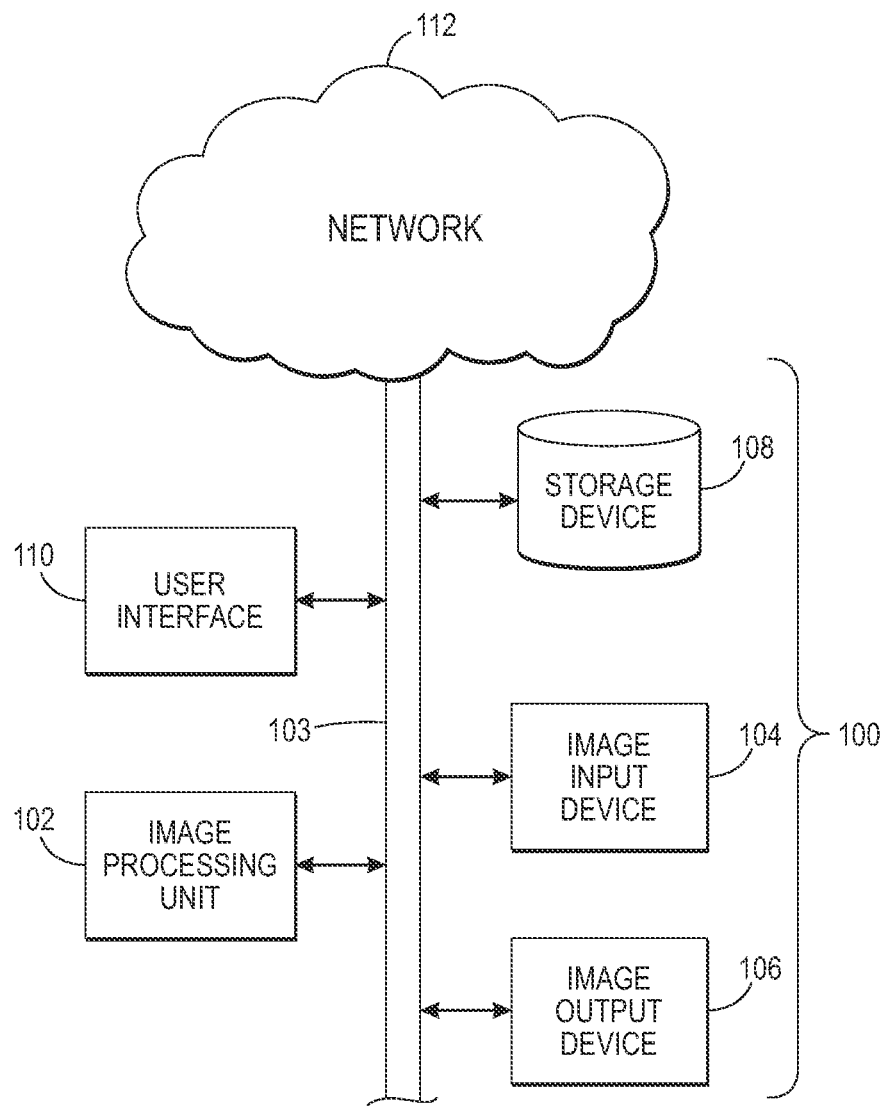
FIG. 1 is a block diagram illustrating a digital image processing apparatus suitable for implementing the exemplary embodiment.

For a general understanding of the present disclosure, reference is made to the drawings. In the drawings, like reference numerals have been used throughout to designate identical elements.

FIG. 1 illustrates a block diagram of an exemplary image processing system (or printing device) 100 configured in accordance with the exemplary embodiment. Exemplary operations that may be performed by the image processing system include various image processing operations, such as scanning, copying, faxing, printing, and the like.

As shown in FIG. 1, at least one image processing unit (or controller) 102 is connected via a communication connection (wired or wireless) 103 to at least one image input device 104 that receives an image as input and derives digital image data representative of the image as is well understood in the art. The image processing unit (IPU) 102 generally receives the digital image data from the image input device 104.

A computer is one possible hardware configuration for the IPU 102. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

Although not specifically shown in the figure, as known to one skilled in the art the IPU 102 typically includes a processing unit, a system memory, and a system bus that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The IPU 102 can further include a hard disk drive, a magnetic disk drive, e.g., to read from or write to a removable disk, and an optical disk drive, e.g., for reading a CD-ROM disk or to read from or write to other optical media. The IPU 102 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

A number of program modules may be stored in the drives and RAM, including an operating system, one or more application programs, other program modules, and program non-interrupt data. The operating system in the IPU 102 can be any of a number of commercially available operating systems.

The IPU 102 is also operably coupled to at least one image output device 106 that receives digital image data from the IPU 102. The image output device 106 may comprise a digital data storage device that stores the digital image data for later retrieval (e.g., CD-ROM, magnetic media, or other storage medium), a video display terminal that generates a visual image based upon the digital image data, and/or a rendering device. More particularly, the rendering device may be a marking engine, such as, for example, an ink jet, xerographic or electrophotographic marking engine or printer.

The IPU 102 is also operably coupled to at least one database 108 that stores data related to digital image processing, including at least one look-up table relating to desktop environment color alerts that signal to the operator (via color and behavior settings) that the image processing system 100 may need attention/maintenance. This database 108 can be a simple fixed magnetic disk drive and/or removable magnetic disk, an optical media reader (e.g., a CD-ROM input device) that receives an optical storage medium, and/or any other suitable digital image data storage device that includes and/or is adapted to receive and read a digital image storage medium.

The image processing system (or printing device) 100 of FIG. 1 further includes at least one user interface (UI) 110 operably coupled to the IPU 102 via a wired or wireless connection. The UI 110, which comprises any suitable input/output device, is used by a user to receive information from and input information to the image processing unit 102. Suitable user interface devices include keyboards/keypads, mechanical buttons/switches, video display terminals with graphical user interfaces, pointing devices such as a joystick or mouse, voice command input devices, touch screens and/or any other suitable input/output device by which a user can receive information from and input information to the IPU 102.

Those of ordinary skill in the art will recognize that it is possible for some overlap to exist in connection with the UI 110 and the image output device(s) 106. For example, a video display terminal or screen of the output device 106 can also be part of the UI 110 and provide visual information to the user.

The UI 110 generally includes one or more desktop environments. As used herein, a desktop environment commonly refers to a particular implementation of graphical user interface (GUI) derived from the desktop metaphor that is seen on most modern personal computers. The GUIs help the user in easily accessing, configuring and modifying many important and frequently accessed specific operating system features. The desktop environment typically consists of icons, windows, toolbars, folders, wallpapers and/or desktop widgets. While the term desktop environment originally described a style of user interfaces following the desktop metaphor, it has also come to describe the programs that realize the metaphor itself.

As illustrated herein, the image processing system 100 and/or the IPU 102 may be optionally connected to at least one computer network 112. For instance, the IPU 102 can send digital image data to and receive digital image data from any network 112 to which it is connected. The IPU 102 can operate in a networked environment using logical and/or physical connections to one or more remote computers. The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet. When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Those of ordinary skill in the art will also recognize that an apparatus formed in accordance with FIG. 1, including the IPU 102, can be provided by a wide variety of known systems. The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It is further noted that there are many sensors within the printing device (or machine) 100. Although not shown, examples of such sensors include, but are not limited to, paper jam sensors, shaft rotation sensors, door interlock sensors, toner concentration sensors, temperature sensors, and the like. These sensors call fault codes when the machine is not functioning properly. These fault codes initiate a machine state change, i.e., machine stop, degraded print quality, or maintain/clean at a convenient moment when production is stopped.

A typical fault code generation process is described below. The image processing system 100 detects an unexpected event, e.g., a paper path sensor did not open and close within the expected time period (in milliseconds). The system 100 triggers an action to reference a "lookup table." The lookup table is used to determine the corrective action(s) and fault code(s) associated with this event to display. A system routine is instigated, which is listed in the lookup table, e.g., "stop printing." A message to the user is displayed on the system, e.g., "Remove paper from area 2," along with an associated illustration to guide the user. The system 100 then waits until the user clears the paper and clears the associated fault code message. The system 100 triggers a start-up routine to get to "printing state."

In accordance with the exemplary embodiments, the UI 110 may incorporate a visual indicator for the operator that the image processing system 100 requires some type of intervention. That is, the desktop environment of the UI 110 may, for example, change color depending on the status of the image processing system 100. It is also noted that the screen saver mode of the desktop environment of the UI 110 may need to be disabled or the screen saver color may need to change with the condition of the image processing system 100.

The desktop environment color indicator feature of the image processing system 100 generally has at least three possible states of operation, including, but not limited to, an "off" (i.e., no color) state, a "steady" (i.e., constant color) state, and a "flashing" (i.e., intermittent color) state, in response to the detection of any one or more machine states (e.g., operation status) of the printing device. The number of colors used depends, for example, on the number of machine states to be detected and/or displayed. For example, each machine state may be represented by a different color. And whether a particular color is "steady" or "flashing" may depend, for example, on the urgency of the corrective action that is required.

In embodiments, machine states may include, for example, PRODUCTION WITHOUT ERROR (no need for assistance), SYSTEM WILL REQUIRE CONSUMABLES (e.g., toner and/or paper within a certain number of prints), SYSTEM RUNNING WITH SUB-STANDARD PRINT QUALITY (e.g., the output requires analysis for sellability), and/or MACHINE IS NOT PRINTING (e.g., due to a significant error). For example, network connectivity could be a screen color change driver. That is, the network may have lost a connection to one or more of the key processing units as shown, for example, in FIG. 1. Further, in some embodiments, machine states may include OFF, STOPPED/FAULTED (e.g., system unable to print due to fault condition), NEEDS ATTENTION (e.g., attention needed soon to continue uninterrupted production), INFORMATIONAL (e.g., informational message exists), PRINTING (e.g., system is printing a job), IDLE (e.g., no active print jobs in system), and DEFAULT (e.g., any other state not included hereinabove). Other machine states may be included and the above list should not be construed as exhaustive.

User settings may be set and/or modified by one or more users, for example, manually through interaction with the graphical user interface (GUI) 110 local to the printing device and/or remotely over the network 112 (e.g., via a print server) using a remote terminal (e.g., a computing device). The customization of the desktop environment indicator operation in accordance with user settings allows the user to personalize their use of the image processing system 100 to suit their preferences with regard to system status updates. User settings may be stored in the database 108, in the memory of the IPU 102 itself, and/or in a memory of a networked computing device such as, for example, a print server. The memory of the IPU 102 or a corresponding print server may store system default settings (e.g., set by the manufacturer) that dictate the default operation of the desktop indicator of a printing device. Customized user settings may be used to override any one or more system default settings of a given printing device. Each system default setting that is not overridden by a customized user setting remains defined for the machine state to which the setting is assigned by default. Additionally, any one or more settings corresponding to desktop environment indicator operation may be reset by the user to return to system default settings. Throughout this description, the term "user setting" is defined as either a user setting utilized to override a system default setting and/or the system default setting itself. User settings may include, for instance, "off", "steady", and "flashing" settings that are configured to change the state of operation of the desktop indicator between "off", "steady", and "flashing, respectively.

In operation, the IPU 102 generally monitors the current machine state of the system 100 and, based on the detected machine state, activates the desktop environment indicator of the system 100 in accordance with the established user setting(s) (e.g., "off", "steady", "flashing") corresponding with the detected machine state. If the user setting corresponding to the current machine state is set to any one of "off", "steady", "flashing", the desktop indicator will be activated accordingly. If the user setting corresponding to the current machine state may be set, for example, to "skip," indicator light behavior is unchanged, and the system continues to monitor the current machine state of the printing device. In this manner, the desktop environment indicator behavior is not altered from its previous behavior unless a machine state is detected in which the corresponding user setting is set to "off", "steady", or "flashing".

Figure 2:
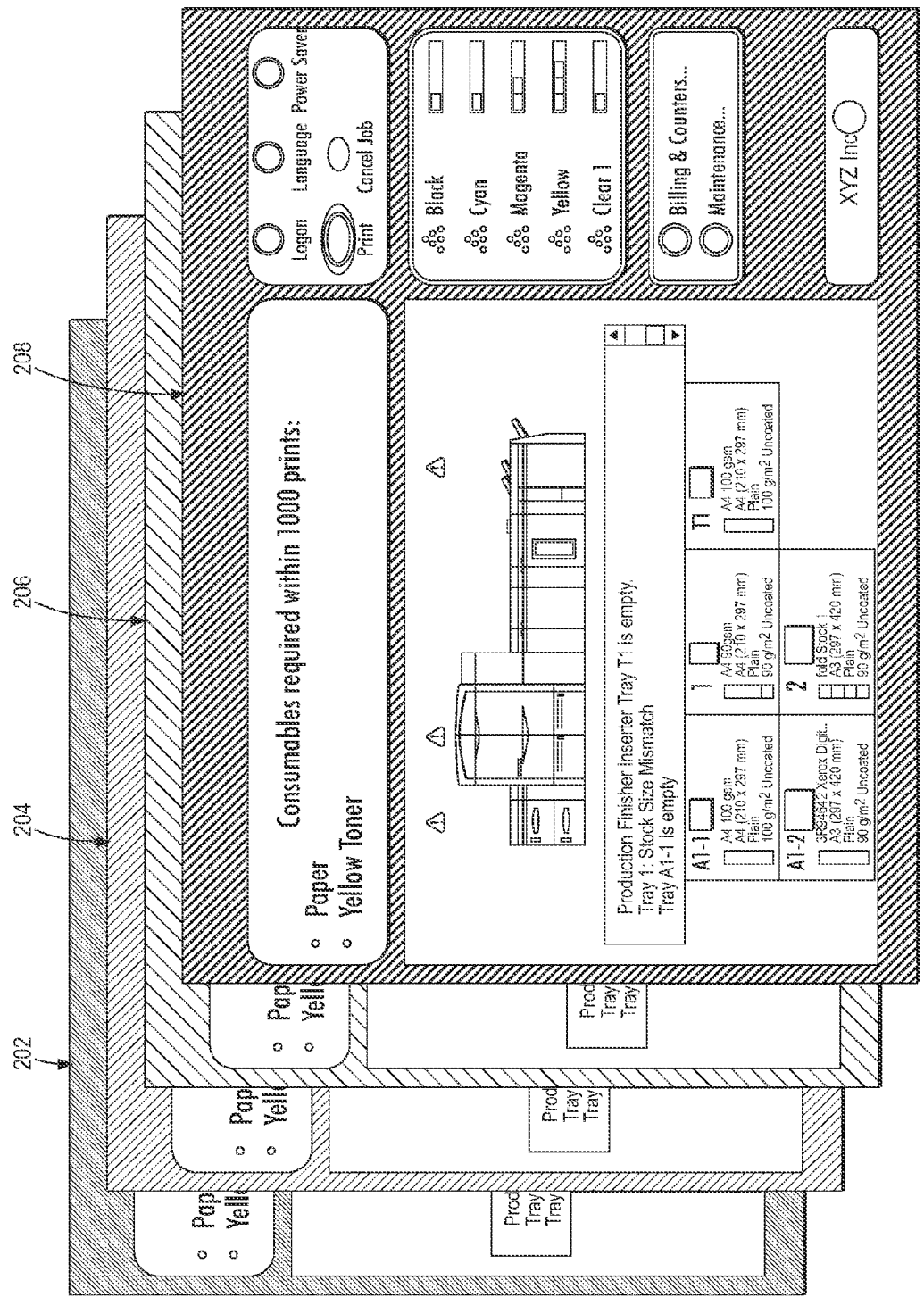
FIG. 2 shows a user interface (UI) adapted in accordance with aspects of the exemplary embodiment.

An example of one possible desktop environment color scheme is shown in FIG. 2. It is to be understood that separate colors may be used represent different machine states. As shown in the figure, different types of hatching are used to represent different colors. Thus, for example, a first screen 202 may feature a blue background and represent a first machine state such as production without error, no need for assistance. A second screen 204 may feature a green background and represent a second machine state such as production will require consumables (e.g., toner and/or paper) within the following 1,000 prints. A third screen 206 may feature an orange background and represent a third machine state such as production is running with sub-standard print quality and the output requires analysis for sellability. A fourth screen 208 may feature a flashing red background and represent a fourth machine state such as the machine is not printing due to a significant error. It is to be understood, of course, that any number of colors and color combinations may be used in accordance with aspects of the exemplary embodiment. Also, the status information may change depending on the needs of the user and/or the functions provided by the image processing system 100.

Figure 3:
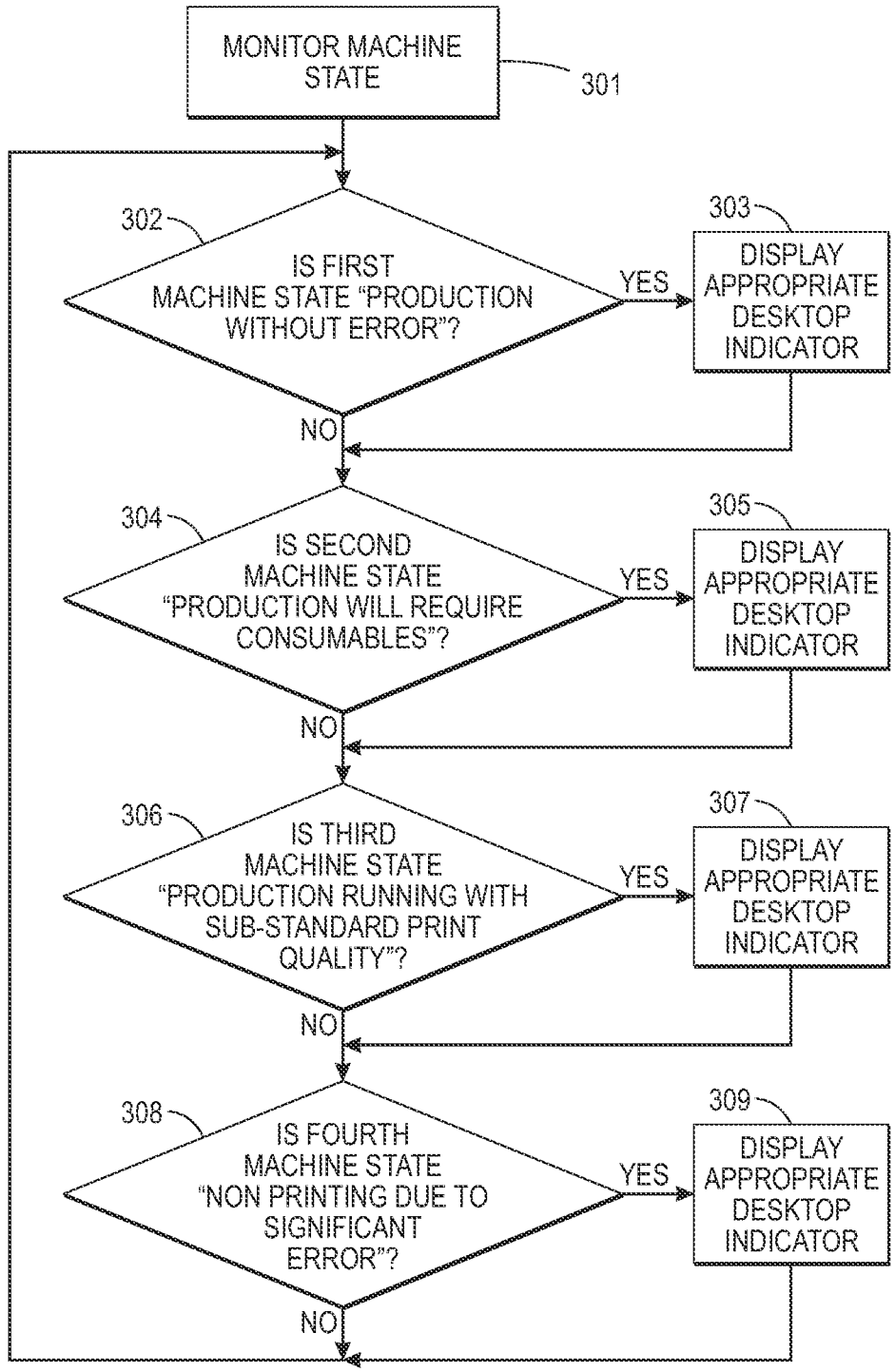
FIG. 3 is a flow chart of an exemplary method of implementing a desktop color indicator system.

Next, an exemplary method of providing a desktop environment warning system for an image processing system 100 in accordance with the present disclosure is shown in FIG. 3 and will be described below. In the exemplary embodiment, the order in which the method detects machine states is based on a relative priority of each machine state relative to other machine states. That is, each query of the method is of a higher priority than the subsequent query to ensure that the method operates as intended. In other embodiments of the present disclosure, the queries may be prioritized in various orders within the purview of one skilled in the art.

With continued reference to FIG. 3, the current state of the image processing system 100 is continuously monitored (301). A determination is made as to whether the current machine state as detected by the method is a first machine state such as "production without error, no need for assistance" (302). If so, the desktop environment indicator feature is activated in accordance with the user setting corresponding to "production without error, no need for assistance" (303). If not, a further determination is made as to whether the current machine state as detected by the method is a second machine state, such as "production will require consumables within the following 1,000 prints" (304). If so, the desktop environment indicator feature is activated in accordance with the user setting corresponding to "production will require consumables within the following 1,000 prints" (305). If not, a further determination is made as to whether the current machine state as detected by the method is an third machine state, such as "production is running with sub-standard print quality and the output requires analysis for sellability" (306). If so, the desktop environment indicator feature is activated in accordance with the user setting corresponding to "production is running with sub-standard print quality and the output requires analysis for sellability" (307). If not, a further determination is made as to whether the current machine state as detected by the method is a fourth machine state, such as "the machine is not printing due to a significant error" (308). If so, the desktop environment indicator feature is activated in accordance with the user setting corresponding to "the machine is not printing due to a significant error" (309). It is to be understood that these are simply examples of various machine states that could be detected, and any suitable combination of other machine states could be incorporated into the exemplary method.

Figure 4:
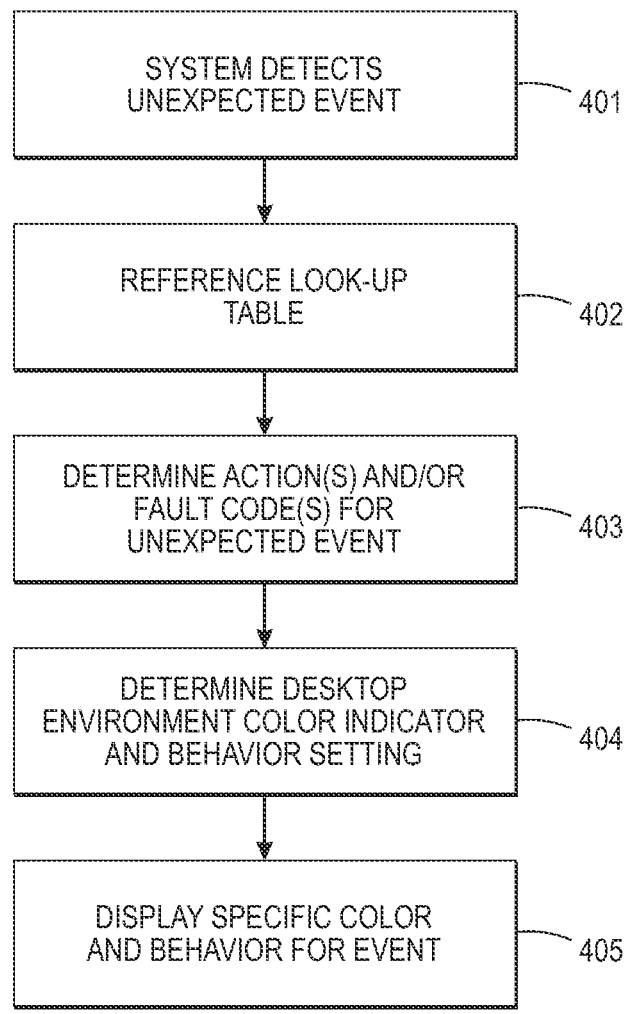
FIG. 4 is a flow chart of an alternative method of implementing a desktop color indicator system.

An alternative embodiment is illustrated in FIG. 4. In this embodiment, the system 100, via, for example, the IPU 102, first detects an unexpected event (or machine state) (401). Such an event may be, for example, that a paper path sensor did not open and close within the expected time period (in milliseconds), any of the other events described above, or any other suitable events that may occur in the image processing system 100. The system 100, via, for example, the IPU 102, references a look-up table stored in the database 108 (402). The look-up table is used to determine the action(s) and/or fault code(s) associated with this event, among other things (403). The fault code(s) may be in any suitable format (e.g., alphanumeric). The IPU 102 may also use the look-up table stored in the database 108 to determine the corresponding machine state and desktop color indicator for the particular event and/or fault code(s) (404). An appropriate signal is then sent to the UI 110 to display a specific color (e.g., red, blue, green, orange, etc.) and behavior/operation (e.g., "steady", "flashing", etc.) for the particular event and/or fault code(s) (405).

Figure 5:
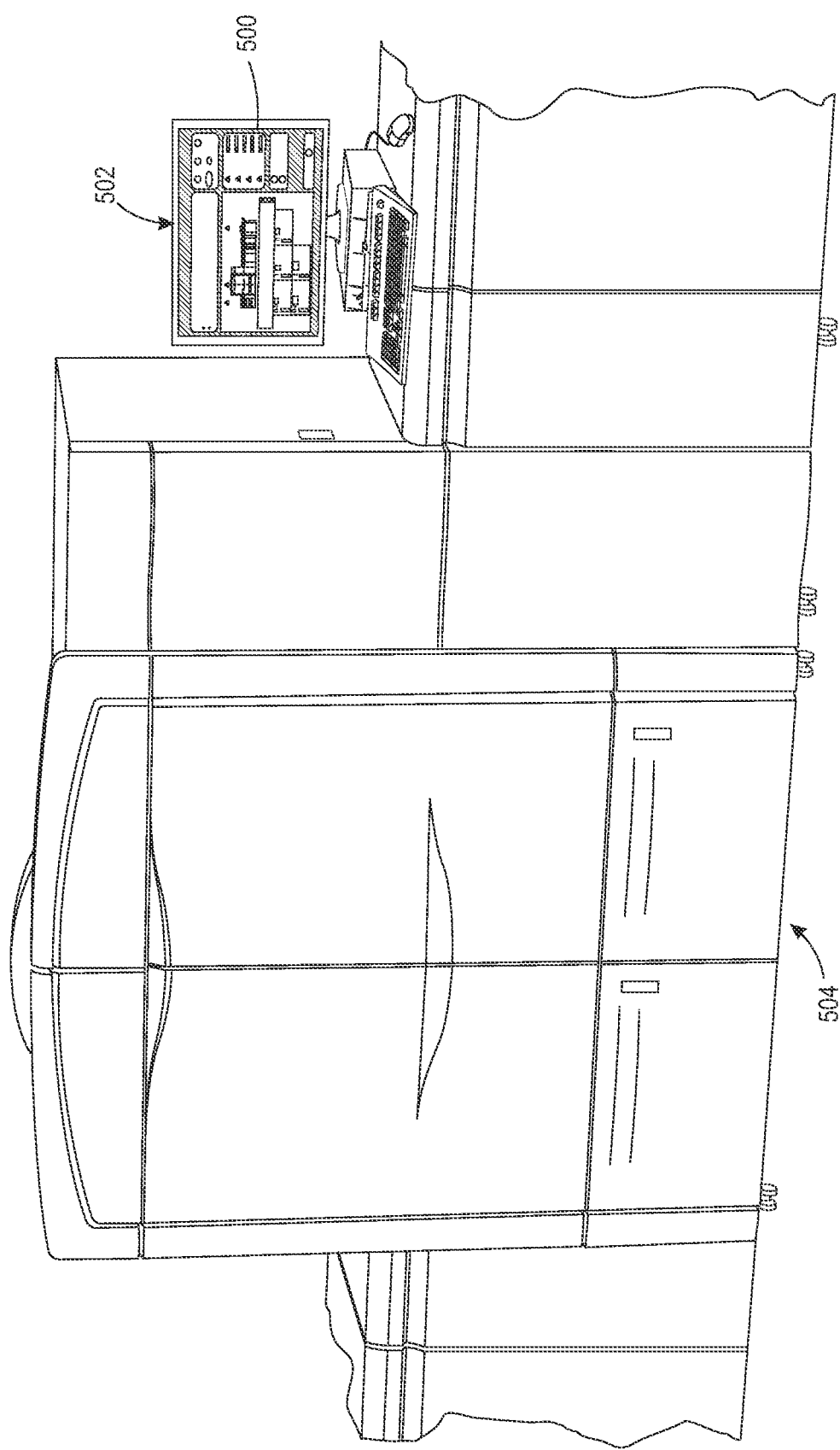
FIG. 5 shows an exemplary desktop environment color alert system for a printing device in operation.

FIG. 5 shows an exemplary desktop environment color alert system 500 implemented on a user interface 502 for a printing device 504 in operation, which eliminates the need for an indicator light on the printing device 504.

In utilizing the desktop environment of the UI 110 as the machine state indicator, it is not necessary for the image processing system 100 to include hardware associated with one or more warning lights and thus costs are reduced. In addition, spare parts relating to the light hardware will not need to be stocked.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the above-described methods. The program storage devices may be, e.g., flash or thumb drives, digital memories, magnetic storage media such as a magnetic disks and magnetic tapes, hard drives, or optically readable digital data storage media. The embodiments are also intended to cover computers programmed to perform the steps of the above-described methods.

Further, the exemplary embodiments may be implemented in a computer program product that may be executed on a computing device. The computer program product may be a non-transitory computer-readable recording medium on which a control program is recorded, such as a disk, hard drive, or may be a transmittable carrier wave in which the control program is embodied as a data signal. Common forms of computer-readable media include, for example, flash drives, thumb drives, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An image processing system comprising:
   a customizable indicator light system;
   a database that stores data related to digital image processing, including at least one look-up table relating to desktop environment color alerts that signal to the operator that the image processing system may need attention or maintenance; and
   an image processing unit
   configured to:
   receive a fault code from one or more machine sensors;
   use the fault code to determine a corresponding machine state and desktop environment color indicator via a look-up table stored in the database,
   wherein each machine state is represented by a different color; and
   wherein the corresponding machine state is detected in accordance with a predetermined priority; and
   send an appropriate signal to a user interface operably coupled to the image processing system to display on a desktop environment of the user interface at least one color and at least one behavior setting representing the corresponding machine state; and wherein the at least one behavior setting is one of an off setting, a steady setting, and a flashing setting configured to set the desktop environment to the off state, the flashing state, and the steady state, respectively.

2. The system of claim 1, further comprising:
an ink jet, xerographic or electrophotographic marking engine or printer.

3. The system of claim 1, wherein the one or more machine sensors comprise paper jam sensors, shaft rotation sensors, door interlock sensors, toner concentration sensors, and temperature sensors.

4. The system of claim 1, wherein the behavior setting depends at least on the urgency of the corrective action that is required.

5. The system of claim 1, wherein the corresponding machine state is at least one of a PRODUCTION WITHOUT ERROR state, a SYSTEM WILL REQUIRE CONSUMABLES state, a SYSTEM RUNNING WITH SUB-STANDARD PRINT QUALITY state, and a MACHINE IS NOT PRINTING state.

6. The system of claim 1, wherein the corresponding machine state is at least one of an OFF state, a STOPPED/FAULTED state, a NEEDS ATTENTION state, an INFORMATIONAL state, a PRINTING state, an IDLE state, and a DEFAULT state.

7. A method comprising:
detecting an unexpected event in an image processing system via one or more sensors;
sending at least one fault code associated with the unexpected event to an image processing unit;
using a look-up table stored in a database to determine a corresponding machine state and at least one desktop color indicator and behavior setting for the unexpected event or fault code,
wherein each machine state is represented by a different color; and
wherein the corresponding machine state is detected in accordance with a predetermined priority;
wherein the at least one behavior setting is one of an off setting, a steady setting, and a flashing setting configured to set at least one desktop color environment to the off state, the flashing state, and the steady state, respectively; and
sending a signal to a user interface operably coupled to the image processing unit to display a specific color and behavior for the unexpected event or fault code.

8. The method of claim 7, wherein the image processing system further comprises an ink jet, xerographic or electrophotographic marking engine or printer.

9. The method of claim 7, wherein the one or more machine sensors comprise paper jam sensors, shaft rotation sensors, door interlock sensors, toner concentration sensors, and temperature sensors.

10. The method of claim 7, wherein the behavior setting depends at least on the urgency of the corrective action that is required.

11. The method of claim 7, wherein the corresponding machine state is at least one of a PRODUCTION WITHOUT ERROR state, a SYSTEM WILL REQUIRE CONSUMABLES state, a SYSTEM RUNNING WITH SUB-STANDARD PRINT QUALITY state, and a MACHINE IS NOT PRINTING state.

12. The method of claim 7, wherein the corresponding machine state is at least one of an OFF state, a STOPPED/FAULTED state, a NEEDS ATTENTION state, an INFORMATIONAL state, a PRINTING state, an IDLE state, and a DEFAULT state.

13. An image processing system comprising:
a user interface including a desktop environment adapted to operate in at least one of an off state, a flashing state, and a steady state;
a customizable indicator light system;
one or more sensors configured to detect at least one machine state corresponding to the operation of the image processing system,
wherein the at least one machine state is detected in accordance with a predetermined priority;
at least one image processing unit in operative communication with the one or more sensors and configured to provide at least one user setting to the user interface,
the at least one user setting including at least one behavior setting configured to selectively set the desktop environment to one of the off state, the flashing state, and the steady state based on the detected machine state; and
wherein the at least one behavior setting configured to set an indicator light to the off state, the flashing state, and the steady state, respectively;
wherein the detected machine state is used to determine a corresponding desktop environment color indicator via a look-up table; and
wherein each machine state is represented by a different color.

14. The image processing system according to claim 13, wherein the detected machine state is at least one of an OFF state, a STOPPED/FAULTED state, a NEEDS ATTENTION state, an INFORMATIONAL state, a PRINTING state, an IDLE state, and a DEFAULT state.

* * * * *